US012558985B1

(12) United States Patent

Xu

(10) Patent No.: US 12,558,985 B1

(45) Date of Patent: Feb. 24, 2026

(54) VEHICLE CHARGING AND DISCHARGING SYSTEM AND POWER SUPPLY TERMINAL THEREOF

(71) Applicant: SHENZHEN HB ELECTRONIC CO., LTD, Shenzhen (CN)

(72) Inventor: Jianjun Xu, Shenzhen (CN)

(73) Assignee: SHENZHEN HB ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 19/281,729

(22) Filed: Jul. 27, 2025

(51) Int. Cl.
| | |
|---|---|
| *B60L 53/16* | (2019.01) |
| *B60L 53/53* | (2019.01) |
| *B60L 53/62* | (2019.01) |
| *H02J 7/34* | (2006.01) |
| *H02M 3/335* | (2006.01) |

(52) U.S. Cl.
CPC ............... *B60L 53/62* (2019.02); *B60L 53/16* (2019.02); *B60L 53/53* (2019.02); *H02J 7/342* (2020.01); *H02M 3/33573* (2021.05); *H02M 3/33584* (2013.01); *B60L 2210/20* (2013.01); *B60L 2210/30* (2013.01); *H02J 2207/20* (2020.01)

(58) Field of Classification Search
CPC .......... B60L 53/16; B60L 53/53; B60L 53/62; H02J 7/342; H02J 2207/20; H02M 3/33573; H02M 3/33584
USPC .......................................................... 307/23
See application file for complete search history.

(56) References Cited

U.S. PATENT DOCUMENTS

2016/0288664 A1* 10/2016 Biagini .................. B60L 53/63

* cited by examiner

*Primary Examiner* — Daniel Kessie
*Assistant Examiner* — Dru M Parries
(74) *Attorney, Agent, or Firm* — Hemisphere Law, PLLC

(57) ABSTRACT

The present disclosure provides a vehicle charging and discharging system and a power supply terminal thereof. The system includes a first conversion module, a second conversion module, and a main control module configured to control a plurality of MOS transistors to be conducted and cut off that are arranged inside the first and second conversion modules, for achieving a conversion from an AC voltage to a DC voltage, and achieving a purpose of boost control during the conversion, thereby solving a technical problem that two new energy vehicles of the related art can't be charged therebetween. The present disclosure can also achieve that a power of a drive battery in a vehicle is reverse output to an AC mains power through reverse charging from the second conversion module to the first conversion module, and is compatible with a DC voltage output to take electricity from new energy vehicles.

16 Claims, 6 Drawing Sheets

VEHICLE CHARGING AND DISCHARGING SYSTEM AND POWER SUPPLY TERMINAL THEREOF

TECHNICAL FIELD

The present disclosure relates to the field of accessories of new energy vehicles, and especially relates to a vehicle charging and discharging system and a power supply terminal thereof.

BACKGROUND

With the popularization of new energy vehicles, a demand for peripheral products of the new energy vehicles is gradually increasing. A drive battery of the new energy vehicle can be regarded as an electrical energy storage device. Currently, one of the peripheral products is to connect electrical energy of the drive battery to the outside through a discharging gun. The discharging gun is configured to convert a DC voltage that is inside the drive battery into an AC voltage and supplies power to some electrical equipment, thereby achieving outdoor cooking and other functions thereof.

However, the demand for the peripheral products of the new energy vehicle is not limited to the above-mentioned take electricity to supply power to the electrical equipment. One of the demands is how to achieve a transfer of electrical energy between two new energy vehicles, that is, how to use the electrical energy of the drive battery that is inside one new energy vehicle to charge the other new energy vehicle.

Therefore, how to design an improved vehicle charging and discharging system to solve the technical problems that electric energy transfer is performed between the two new energy vehicles mentioned above, while also supplying power to the electrical equipment.

SUMMARY

The technical problems to be solved: in view of the shortcomings of the related art, an objective of the present disclosure is to provide a vehicle charging and discharging system and a power supply terminal thereof which can solve the technical problem that two new energy vehicles can't be charged therebetween in the related art.

A vehicle charging and discharging system according to an embodiment of the present disclosure is provided, the system includes a first port connected to a first drive battery of one new energy vehicle in a conductive manner to take electricity.

The vehicle charging and discharging system further includes:
- a paired module connected to the first drive battery in a conductive manner through the first port;
- a first conversion module electrically connected to the paired module;
- a second port electrically connected to a second drive battery of the other new energy vehicle;
- a second conversion module electrically connected to a second drive battery through the second port;
- a transformer electrically connected to both the first conversion module and the second conversion module;
- an acquisition module configured to collect an input voltage and an output voltage of the first conversion module and the second conversion module, to form a detection result thereof;

- a main control module electrically connected to all of the paired module, the first conversion module, the second conversion module and the acquisition module; and wherein the paired module is configured to send pairing information to the main control module, so that a communication connection is established between the first drive battery and the second drive battery, the main control module is configured to control the paired module to start working and output an AC voltage of the first drive battery to the first conversion module, and the first conversion module is configured to boost the AC voltage to a first voltage and then rectify the first voltage; and wherein the transformer is configured to convert the first voltage that is an AC voltage into an AC second voltage and then output the AC second voltage to the second conversion module, the second conversion module converts the AC second voltage into a DC third voltage, and the third voltage is transmitted to the second drive battery through the second port for charging the second drive battery; and wherein each of the first conversion module and the second conversion module includes a plurality of MOS transistors, and the main control module controls the plurality of MOS transistors to be turned on and turned off during a voltage conversion process between the first conversion module and the second conversion module based on the detection result of the acquisition module.

The vehicle charging and discharging system of the present disclosure realizes to charge between two vehicles, that is, a charging operation from the first drive battery to the second drive battery is obtained, thereby solving the technical problem in the related art that two vehicles can't be charged therebetween.

In addition, a switch circuit that is composed of the plurality of MOS transistors and the capacitive element are provided, so that the first conversion module and the second conversion module are provided to achieve that the AC voltage is converted to the DC voltage, and voltage shaping is performed, which includes voltage boosting or voltage lowering is performed, and the DC voltage is converted to the AC voltage. The present disclosure adopts the plurality of MOS transistors, which can make such above conversion more rapid and achieve anti-interference and anti-streaming at front and back ends thereof.

The vehicle charging and discharging system of the present disclosure also converts electrical energy through the transformer. The transformer provides the primary coil and the secondary coil, so that a high conversion efficiency that the electrical energy is converted between the primary coil and the secondary coil is occurred, which can withstand a larger maximum voltage thereof.

The vehicle charging and discharging system of the present disclosure can also achieve that a current is output and converted from the second conversion module to the first conversion module, the third port is configured to provide the AC power for an electrical equipment at the outside of the vehicle, and the DC output port is provided to realize a DC charging of portable electronic devices. In addition, when the first drive battery outputs the AC voltage through the paired module, the first drive battery can also directly output the AC voltage and the current with a mains voltage and a waveform to the third port, for achieving to supply power for the electrical equipment at the outside of the vehicle.

Finally, a power supply terminal according to an embodiment of the present disclosure is provided and includes the vehicle charging and discharging system above mentioned, wherein the power supply terminal further includes a mainframe, a first charging gun, a second charging gun, and wherein all of the first conversion module, the second conversion module, the transformer, the main control module and the acquisition module are arranged inside the mainframe, the paired module installed in the first charging gun, the first charging gun electrically connected to the first port, and the second charging gun electrically connected to the second port.

DETAILED DESCRIPTION

Reference will now be made in detail to embodiments, examples of which are illustrated in the accompanying drawings.

Figure 1:
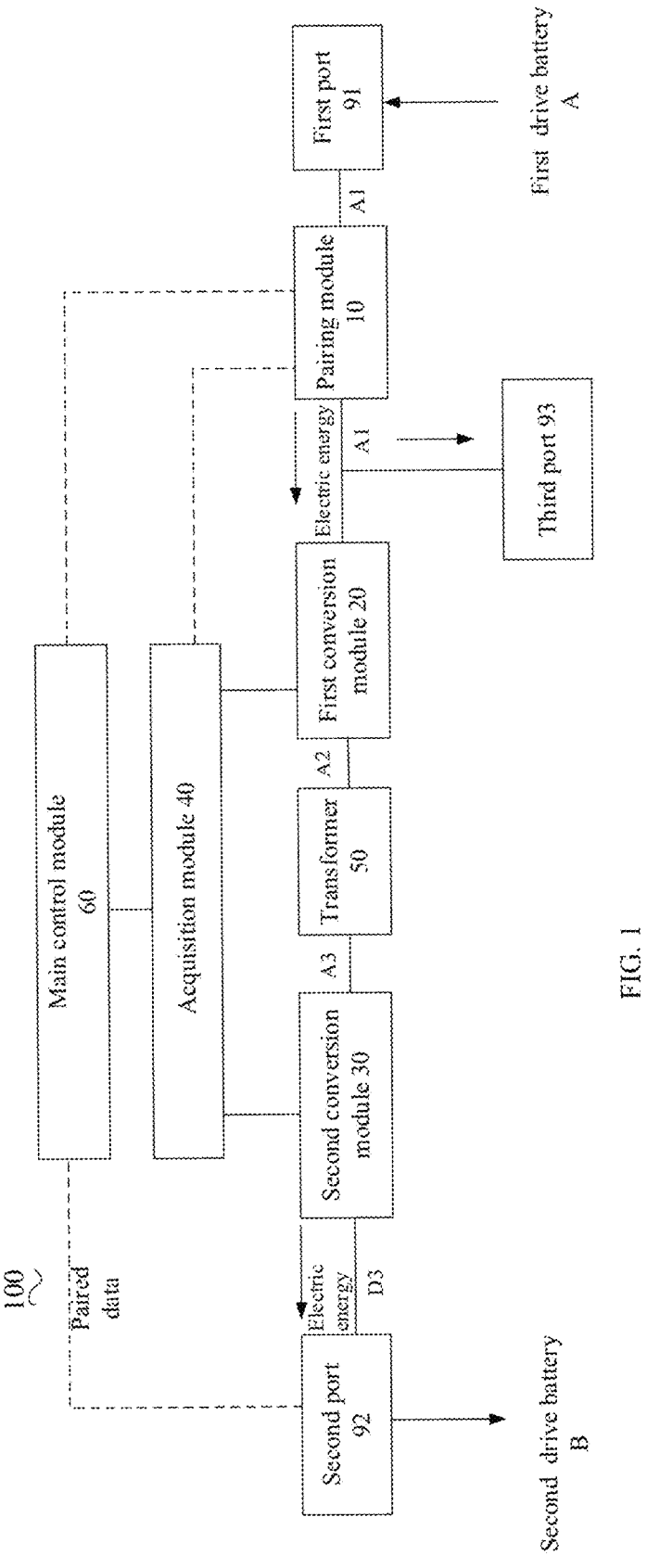
FIG. 1 is a schematic diagram of a vehicle charging and discharging system in accordance with an embodiment of the present disclosure.

Referring to FIG. 1, a vehicle charging and discharging system 100 according to an embodiment of the present disclosure is provided. The vehicle charging and discharging system 100 includes a first port 91 connected to a first drive battery A of one new energy vehicle in a conductive manner to take electricity. The first drive battery A outputs an AC voltage through the first port 91, and a power of the AC voltage is generally less than 7 KW. The AC voltage has the same frequency and an amplitude range as the mains power, such as a voltage of 50 HZ, and 220V.

Furthermore, the system includes a paired module 10, a first conversion module 20, a second port 92, a second conversion module 30, an acquisition module 40, a transformer 50 and a main control module 60.

The paired module 10 is connected to the first drive battery A in a conductive manner through the first port 91, the first conversion module 20 electrically connected to the paired module 10, the second port 92 electrically connected to a second drive battery B of the other new energy vehicle, the second conversion module 30 electrically connected to the second drive battery B through the second port 92, the transformer 50 electrically connected to both the first conversion module 20 and the second conversion module 30, the acquisition module 40 configured to collect an input voltage and an output voltage of the first conversion module 20 and the second conversion module 30, to form a detection result thereof, and the main control module 60 electrically connected to all of the paired module 10, the first conversion module 20, the second drive battery B, the second conversion module 30 and the acquisition module 40.

When the new energy vehicle with the first drive battery A charges another new energy vehicle with the second drive battery B:

the paired module 10 is configured to send pairing information to the main control module 60, so that a communication connection is established between the first drive battery A and the second drive battery B, the main control module 60 is configured to control the paired module 10 to start working and output an AC voltage of the first drive battery A to the first conversion module 20, and the first conversion module 20 is configured to boost the AC voltage to a first voltage and then rectify the first voltage.

The pairing information here mainly includes: trigger information for connecting the paired module 10, as well as a voltage range and a current range output from the first drive battery A are obtained by the paired module 10 itself. When the main control module 60 detects that the paired module 10 is connected, the main control module 60 sends information to the second drive battery B, obtains the maximum rechargeable voltage and a current range of the second drive battery B, to determine whether it is matched. When a match is determined, the main control module 60 sends a control signal to the paired module 10. A relay that is set inside the paired module 10 is controlled by the main control module 60, and then the paired module 10 is turned on. The paired module 10 transmits an AC voltage A1 that is obtained from the first drive battery A to the first conversion module 20, thereby starting to charge the second drive battery B. During the charging process, the main control module 60 can also monitor a voltage and a current output by the paired module 10 in real time, thereby obtaining charging information of the second drive battery B for being displayed.

An AC voltage A1 of the first drive battery A is output to the first conversion module 20, and then the first conversion module 20 is configured to boost the AC voltage A1 to a first voltage A2 and then rectify the first voltage A2.

Specifically, the transformer 50 is configured to perform voltage transformation on the first voltage A2 that is an AC voltage, and then convert the first voltage A2 into an AC second voltage A3 and then output the AC second voltage A3 to the second conversion module 30, the second conversion module 30 converts the AC second voltage A3 into a DC third voltage D1, and the third voltage D1 is transmitted to the second drive battery B through the second port 92 for charging the second drive battery B.

Figure 2:
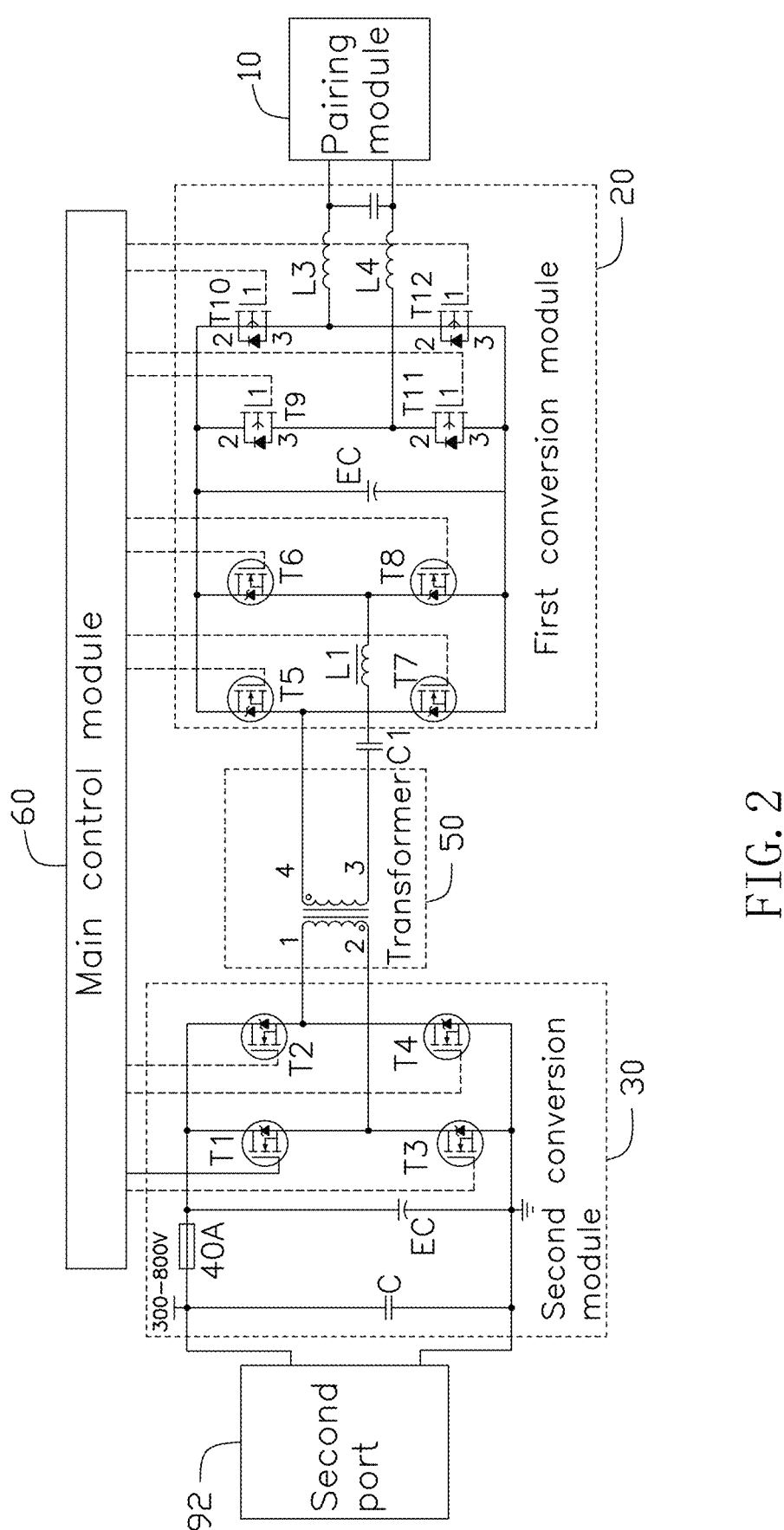
FIG. 2 is a circuit schematic diagram of a first conversion module to a second conversion module of the vehicle charging and discharging system of the present disclosure.

Referring to FIG. 2, each of the first conversion module 20 and the second conversion module 30 includes a plurality of MOS transistors, and the main control module 60 controls the plurality of MOS transistors to be turned on and turned off during a voltage conversion process between the first conversion module 20 and the second conversion module 30 based on the detection result of the acquisition module 40.

The vehicle charging and discharging system 100 of the present disclosure realizes to charge between two vehicles, that is, a charging operation from the first drive battery A to the second drive battery B is obtained, thereby solving the technical problem in the related art that two vehicles can't be charged therebetween.

In addition, a switch circuit that is composed of the plurality of MOS transistors and the capacitive element are provided, so that the first conversion module 20 and the second conversion module 30 are provided to achieve that the AC voltage is converted to the DC voltage, and voltage boosting is performed. The plurality of MOS transistor is provided to make such conversion more rapid and improve anti-interference and anti-streaming capabilities of the front-end and the back-end thereof. The vehicle charging and discharging system 100 of the present disclosure also converts electrical energy through the transformer 50. The transformer 50 provides the primary coil and the secondary coil, so that a high conversion efficiency that the electrical energy is converted between the primary coil and the secondary coil is occurred, which can withstand a larger maximum voltage thereof.

The first conversion module 20 adopts a sinusoidal pulse width modulation method to obtain the voltage boosting from the first conversion module 20 to the transformer 50. Such modulation method requires the main control module 60 to switch conduction states of each MOS transistor at a fast frequency, and superimpose a plurality of conduction voltages to obtain a sine wave that conforms to a waveform thereof.

Figure 3:
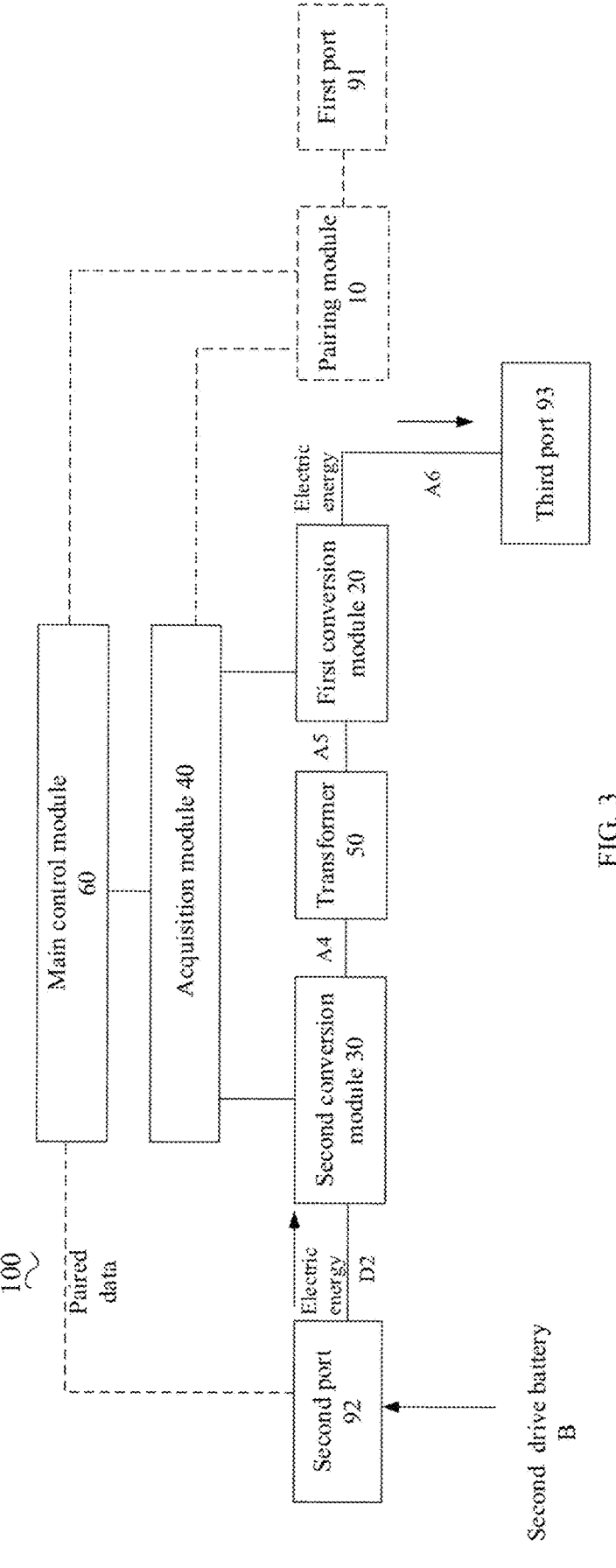
FIG. 3 is a schematic diagram of a working process of the vehicle charging and discharging system of the present disclosure.

Referring to FIG. 3, the system 100 further includes a third port 93 electrically connected to the paired module 10. When the first drive battery A outputs an AC voltage to the first conversion module 20 through the paired module 10, the third port 93 also outputs the AC voltage. At this time, the AC voltage output from the third port 93 is a mains voltage that has not been boosted by the first conversion module 20, which is a sine wave of 220V and 50 HZ.

When the second conversion module 30 is connected to the second drive battery B through the second port 92 and needs to be charged, both the third port 93 and the second port 92 can output electrical energy. A difference is that the second port 92 outputs the DC voltage, while the third port 93 outputs the AC voltage. At this point, a sum of a charging power of the DC voltage of the second port 92 and a power of the AC voltage of the third port 93 is equal to a total power output of the first drive battery A.

When the second port 92 is not connected to the second drive battery B and does not require to be charged, only the third port 93 outputs the AC voltage to supply power for an external electrical equipment. At this time, the power of the third port 93 is the same as a total power output from the first driving battery A.

Referring to FIG. 3, the vehicle charging and discharging system 100 of the present disclosure can also achieve current output and conversion from the second conversion module 30 to the first conversion module 20, thereby supplying power to the external electrical equipment and charging portable electronic devices. It should be noted that when the second conversion module 30 outputs the current to the first conversion module 20, the structure of the entire vehicle charging and discharging system 100 is the same as the structure that the first conversion module 20 outputs the electrical energy to the second conversion module 30 described above. The difference is only lied in a working mode, a direction that the electrical energy is output changes, and a control mode that the plurality of MOS transistors is controlled to be turned on or turned off, which is mainly monitored and controlled by the main control module 60.

When the second conversion module 30 transmits the electrical energy to the first conversion module 20, the vehicle charging and discharging system 100 also includes the aforementioned third port 93.

The third port 93 is electrically connected between the first conversion module 20 and the paired module 10, the second drive battery B delivering a DC fourth voltage D2 to the second conversion module 30 through the second port 92, and the second conversion module 30 stably output the DC fourth voltage D2 to an AC fifth voltage A4, the transformer 50 coupled output the fifth voltage A4 to an AC sixth voltage A5 and then output the sixth voltage A5 to the first conversion module 20, the first conversion module 20 rectified the AC sixth voltage A5 into a seventh voltage A6 with a mains voltage and a waveform, and output the seventh voltage A6 through the third port 93. At this time, the voltage of the third port 93 is the mains voltage, which is a sine wave of 220V and 50 HZ.

Each of the first conversion module 20 and the second conversion module 30 is a bidirectional input and a bidirectional output.

When the AC voltage of the first drive battery A is output to the second port 92 by sequentially passing through the first port 91, the paired module 10, the first conversion module 20, the transformer 50 and the second conversion module 30, the second drive battery B obtains the electrical energy from the first drive battery A to charge between two new energy vehicles.

When the DC voltage of the second drive battery B passes through the second port 92, the second conversion module 30, the transformer 50, the first conversion module 20 and the third port 93 in sequence, the second drive battery B supplies power to the third port 93, so that the new energy vehicle provides the AC voltage to the outside.

Referring to FIG. 2, the first conversion module 20 includes: two full bridge MOS transistor groups (T5-T8,T9-T12) connected in series with each other, each of the two full bridge MOS transistor groups (T5-T8,T9-T12) including four MOS transistors, and gates of the four MOS transistors (T5-T8,T9-T12) electrically connected to the main control module 60, the main control module 60 configured to individually control a voltage of the gate of each of the four MOS transistors (T5-T8,T9-T12) to obtain different outputs of the first conversion module 20.

The four MOS transistors of each full bridge MOS transistor group include a first MOS transistor (T5/T9), a second MOS transistor (T7/T11), a third MOS transistor (T6/T10) and a fourth MOS transistor (T8/T12).

The drain of the first MOS transistor (T5/T9) is connected to the source of the second MOS transistor (T7/T11), the drain of the third MOS transistor (T6/T10) connected to the source of the fourth MOS transistor (T8/T12), the source of the first MOS transistor (T5/T9) connected to the source of the third MOS transistor (T6/T10), and the drain of the third MOS transistor (T6/T10) connected to the drain of the fourth MOS transistor (T8/T12). Both the source of the first MOS transistor (T5/T9) and the drain of the second MOS transistor (T7/T11) form a first terminal, and both the drain of the first MOS transistor (T5/T9) and the drain of the third MOS transistor (T6/T10) form a second terminal. The first terminal and the second terminal are connected to the paired module 10 in a conductive manner.

The first MOS transistor (T5/T9) and the third MOS transistor (T6/T10) are synchronously turned on under a control of the main control module 60, and the second MOS transistor (T7/T11) and the fourth MOS transistor (T8/T12) are synchronously turned on under the control of the main control module 60, wherein when the first MOS transistor (T5/T9) is turned on, the second MOS transistor (T7/T11) is turned off and in a non-conductive state.

A capacitive element with a polarity is connected between the first terminal and/or the second terminal of the full bridge MOS transistor group, and the capacitive element is configured to perform voltage compensation on the first terminal or the second terminal during in a discharge process, for obtaining voltage boosting thereof.

The transformer 50 includes a primary coil and a secondary coil coupled in opposite phases to each other, the primary coil connected to the second conversion module 30, and the secondary coil connected to the first conversion module 20.

Figure 4:
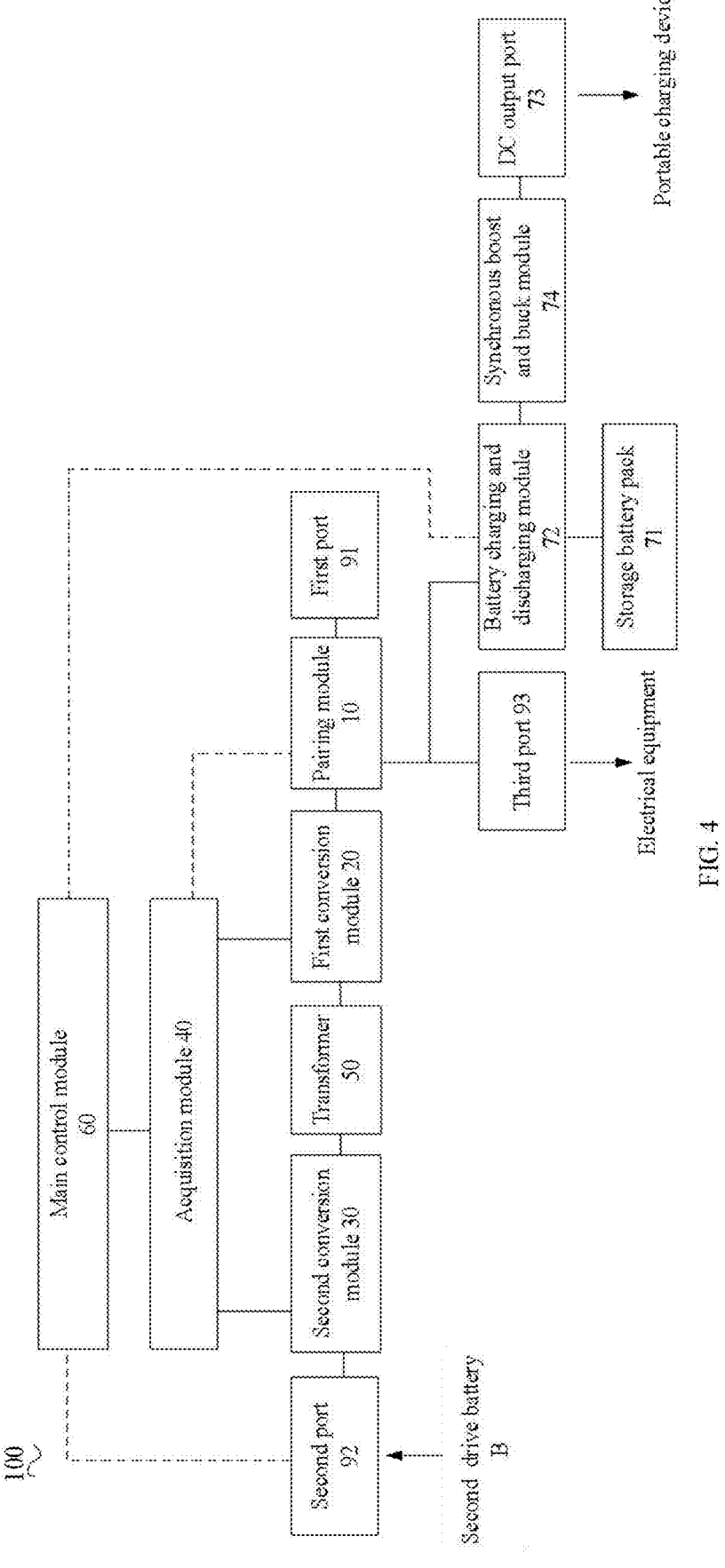
FIG. 4 is a more detailed schematic diagram of the vehicle charging and discharging system with a storage battery pack of the present disclosure.

Referring to FIG. 4, furthermore, the system 100 also includes a storage battery pack 71, a battery charging and discharging module 72 and at least one DC output port 73.

The at least one DC output port 73 is electrically connected to the battery charging and discharging module 72, and configured to obtain electrical energy of the storage battery pack 71 from the battery charging and discharging module 72, the first conversion module 20 or the second conversion module 30 configured to charge the storage battery pack 71 through the battery charging and discharging module 72.

The at least one DC output port 73 includes two or more DC output ports that include a USB port and a TYPE-C port, a voltage and a current output from the two or more DC output ports 73 are not exactly the same.

Figure 5:
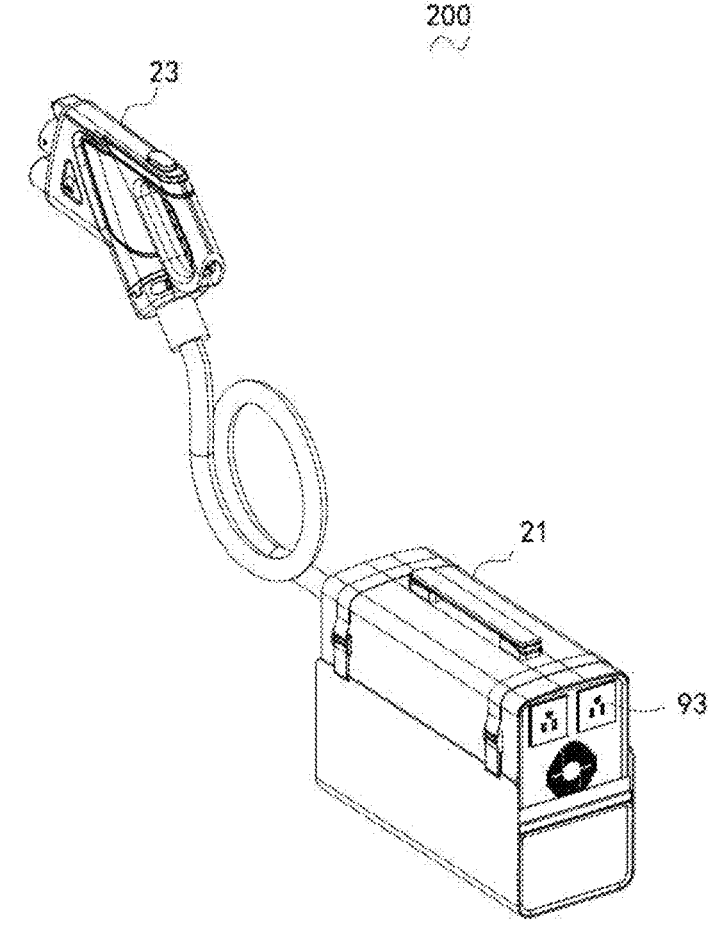
FIG. 5 is a schematic view of a power supply terminal in accordance with an embodiment of the present disclosure.

Referring to FIG. 5, furthermore, the vehicle charging and discharging system 100 also includes a synchronous boost and buck module 74 electrically connected between the DC output port 73 and the battery charging and discharging module 72, and configured to convert a DC voltage within the storage battery pack 71 into DC voltages with different sizes and supply power to the two or more of the DC output ports 73 respectively.

A power supply terminal 200 according to an embodiment of the present disclosure is provided. The power supply terminal 200 includes the above-mentioned vehicle charging and discharging system 100.

Figure 6:
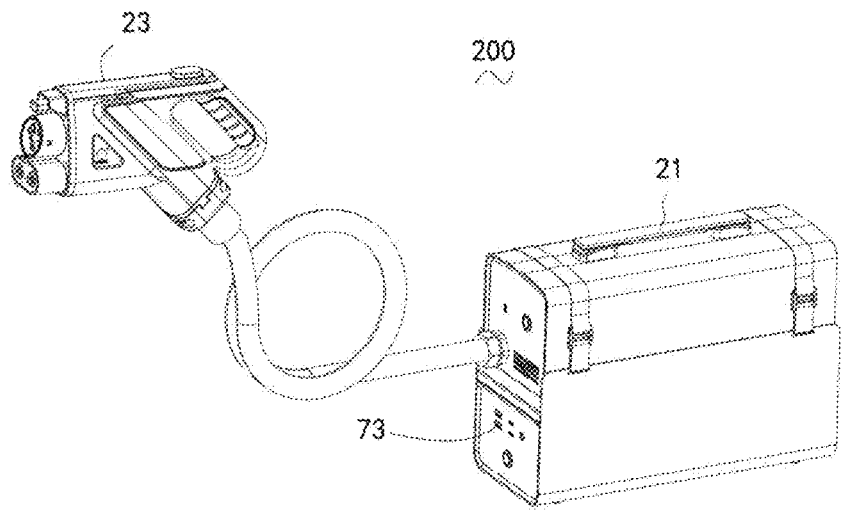
FIG. 6 is similar to FIG. 5, but shown from another view.
Figure 7:
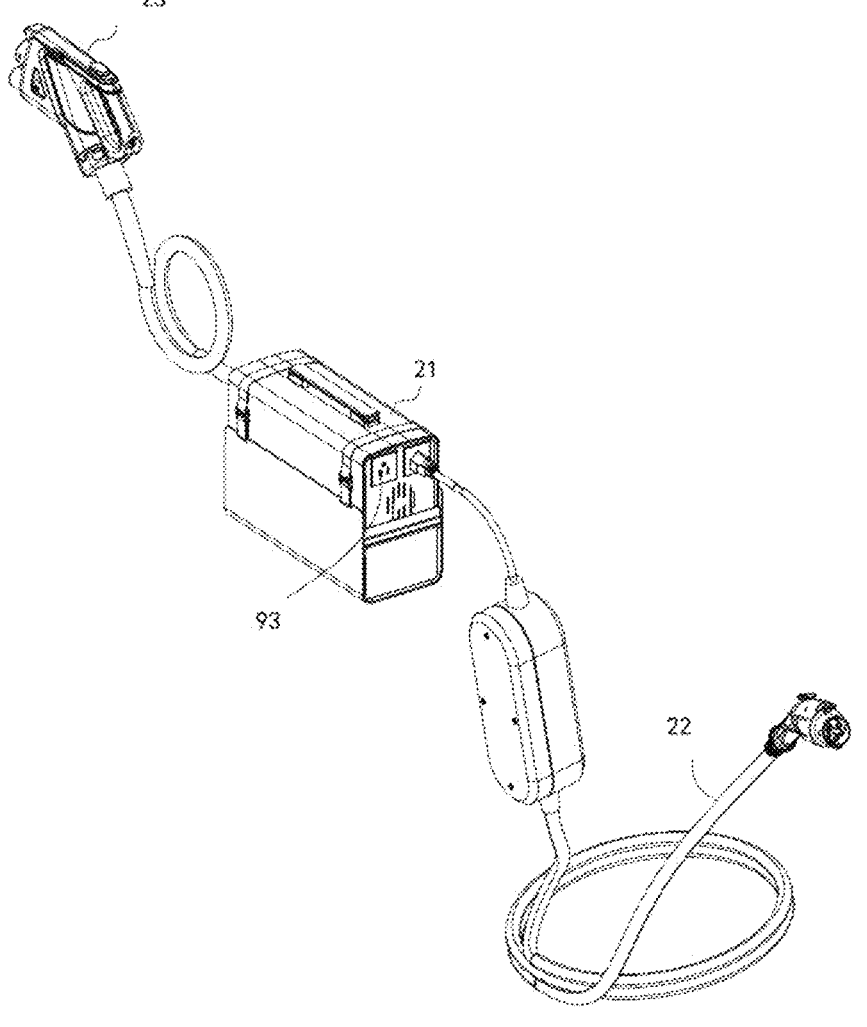
FIG. 7 is a schematic diagram of the power supply terminal of the present disclosure, shown the power supply terminal in a usage state.

Referring to FIG. 1, FIG. 6 and FIG. 8, the power supply terminal includes: a mainframe 21, a first charging gun 22 and a second charging gun 23.

All of the first conversion module 20, the second conversion module 30, the transformer 50, the main control module 60, the acquisition module 40, the storage battery pack 71 and the battery charging and discharging module 72 are arranged inside the mainframe 21. The first charging gun 22 is electrically connected to the first port 91, and the second charging gun 23 is electrically connected to the second port 92, wherein the paired module 10 is installed inside the first charging gun 22, and both the third port 93 and the DC output port 73 are arranged on a surface of the mainframe 21.

During in a usage state, when the external device needs to be supplied power or the storage battery pack 71 needs to be charged, the second charging gun 23 is plugged into a charging interface of the new energy vehicle, the second drive battery B passes through the second charging gun 23, the second port 92, the second conversion module 30, the transformer 50, and the first conversion module 20 to provide the AC voltage to the third port 93, while generating the DC voltage to supply power to the battery charging and discharging module 72, so that the battery charging and discharging module 72 charges the storage battery pack 71. At this time, the third port 93 and the DC output port 73 supply power to the external device. After the second charging gun 23 is removed, the storage battery pack 71 is discharged through the battery charging and discharging module 72 to still supply power to the DC output port 73.

When it is necessary to provide the first drive battery A of one new energy vehicle to charge the second drive battery B of the other new energy vehicle, the first charging gun 22 and the second charging gun 23 are respectively plugged into corresponding charging interfaces of the two new energy vehicles. At this time, the electrical energy of the first drive battery A is output to the first conversion module 20 through the paired module 10, the main control module 60 controls the first conversion module 20 and the second conversion module 30 respectively based on the detection result that is collected by the acquisition module 40, controls the MOS transistor within the first conversion module 20 to be turned on, and outputs the electrical energy from the first drive battery A to the second drive battery B by sequentially passing through the first conversion module 20, the transformer 50 and the second conversion module 30, thereby achieving for charging the two batteries between the two vehicles.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A vehicle charging and discharging system comprising a first port connected to a first drive battery of one new energy vehicle in a conductive manner to take electricity, the system comprising:

a paired module connected to the first drive battery in a conductive manner through the first port;

a first conversion module electrically connected to the paired module;

a second port electrically connected to a second drive battery of the other new energy vehicle;

a second conversion module electrically connected to a second drive battery through the second port;

a transformer electrically connected to both the first conversion module and the second conversion module;

an acquisition module configured to collect an input voltage and an output voltage of the first conversion module and the second conversion module, to form a detection result thereof;

a third port electrically connected between the first conversion module and the paired module, wherein the third port is configured to power external equipment;

the second drive battery delivering a DC fourth voltage to the second conversion module through the second port, and the second conversion module stably output the DC fourth voltage to an AC fifth voltage;

the transformer coupled output the fifth voltage to an AC sixth voltage and then output the sixth voltage to the first conversion module;

the first conversion module rectified the AC sixth voltage into a seventh voltage with a mains voltage and a waveform, and output the seventh voltage through the third port;

a main control module electrically connected to all of the paired module, the first conversion module, the second conversion module and the acquisition module; and wherein the paired module is configured to send pairing information to the main control module, so that a communication connection is established between the first drive battery and the second drive battery, the main control module is configured to control the paired module to start working and output an AC voltage of the first drive battery to the first conversion module, and the first conversion module is configured to boost the AC voltage to a first voltage and then rectify the first voltage; and wherein the transformer is configured to convert the first voltage that is an AC voltage into an AC second voltage and then output the AC second voltage to the second conversion module, the second conversion module converts the AC second voltage into a DC third voltage, and the third voltage is transmitted to the second drive battery through the second port for charging the second drive battery; and wherein each of the first conversion module and the second conversion module comprises a plurality of MOS transistors, and the main control module controls the plurality of MOS transistors to be turned on and turned off during a voltage conversion process between the first conversion module and the second conversion module based on the detection result of the acquisition module.

2. The system as claimed in claim 1, wherein the system further comprises:

a storage battery pack;

a battery charging and discharging module electrically connected to the storage battery pack and the first conversion module or the second conversion module;

at least one DC output port; and wherein the DC output port is electrically connected to the battery charging and discharging module, and configured to obtain electrical energy of the storage battery pack from the battery charging and discharging module, the first conversion module or the second conversion module configured to charge the storage battery pack through the battery charging and discharging module.

3. The system as claimed in claim 2, wherein the at least one DC output port comprises two or more DC output ports that comprise a USB port and a TYPE-C port; a voltage and a current output from the two or more DC output ports are not exactly the same.

4. The system as claimed in claim 3, wherein the system further comprises a synchronous boost and buck module electrically connected between the DC output port and the battery charging and discharging module, and configured to convert a DC voltage within the storage battery pack into DC voltages with different sizes and supply power to the two or more of the DC output ports, respectively.

5. The system as claimed in claim 1, wherein each of the first conversion module and the second conversion module is a bidirectional input and a bidirectional output; and wherein when the AC voltage of the first drive battery is output to the second port by sequentially passing through the first port, the paired module, the first conversion module, the transformer and the second conversion module, the second drive battery obtains electrical energy from the first drive battery to charge between two new energy vehicles; and wherein when the DC voltage of the second drive battery passes through the second port, the second conversion module, the transformer, the first conversion module and the third port in sequence, the second drive battery supplies power to the third port, so that the new energy vehicle provides the AC voltage to the outside.

6. The system as claimed in claim 5, wherein the first conversion module comprises:

two full bridge MOS transistor groups connected in series with each other, each of the two full bridge MOS transistor groups comprising four MOS transistors, and gates of the four MOS transistors electrically connected to the main control module, the main control module configured to individually control a voltage of the gate of each of the four MOS transistors to obtain different outputs of the first conversion module.

7. The system as claimed in claim 6, wherein the four MOS transistors of each full bridge MOS transistor group comprise a first MOS transistor, a second MOS transistor, a third MOS transistor and a fourth MOS transistor;

the drain of the first MOS transistor connected to the source of the second MOS transistor, the drain of the third MOS transistor connected to the source of the fourth MOS transistor, the source of the first MOS transistor connected to the source of the third MOS transistor, and the drain of the third MOS transistor connected to the drain of the fourth MOS transistor;

both the source of the first MOS transistor and the drain of the second MOS transistor formed a first terminal;

both the drain of the first MOS transistor and the drain of the third MOS transistor formed a second terminal; and wherein the first MOS transistor and the third MOS transistor are synchronously turned on under a control of the main control module, and the second MOS transistor and the fourth MOS transistor are synchronously turned on under the control of the main control module, wherein when the first MOS transistor is turned on, the second MOS transistor is turned off and in a non-conductive state.

8. The system as claimed in claim 7, wherein a capacitive element with a polarity is connected between the first terminal and/or the second terminal of the full bridge MOS transistor group, and the capacitive element is configured to perform voltage compensation on the first terminal or the second terminal during in a discharge process, for obtaining voltage boosting thereof.

9. The system as claimed in claim 5, wherein the transformer comprises a primary coil and a secondary coil coupled in opposite phases to each other, the primary coil connected to the second conversion module, and the secondary coil connected to the first conversion module.

10. A power supply terminal comprising: a mainframe, a first charging gun, a second charging gun and a vehicle charging and discharging system as claimed in claim 1, wherein all of the first conversion module, the second conversion module, the transformer, the main control module and the acquisition module are arranged inside the mainframe, the paired module installed in the first charging gun, the first charging gun electrically connected to the first port, and the second charging gun electrically connected to the second port.

11. The power supply terminal as claimed in claim 10, wherein the vehicle charging and discharging system further comprises:

a storage battery pack;

a battery charging and discharging module electrically connected to the storage battery pack and the first conversion module or the second conversion module;

at least one DC output port; and wherein the DC output port is electrically connected to the battery charging and discharging module, and configured to obtain electrical energy of the storage battery pack from the battery charging and discharging module, the first conversion module or the second conversion module configured to charge the storage battery pack through the battery charging and discharging module.

12. The power supply terminal as claimed in claim 11, wherein the at least one DC output port comprises two or more DC output ports that comprise a USB port and a TYPE-C port; a voltage and a current output from the two or more DC output ports are not exactly the same.

13. The power supply terminal as claimed in claim 12, wherein the vehicle charging and discharging system further comprises a synchronous boost and buck module electrically connected between the DC output port and the battery charging and discharging module, and configured to convert a DC voltage within the storage battery pack into DC voltages with different sizes and supply power to the two or more of the DC output ports respectively.

14. The power supply terminal as claimed in claim 10, wherein each of the first conversion module and the second conversion module is a bidirectional input and a bidirectional output; and wherein when the AC voltage of the first drive battery is output to the second port by sequentially passing through the first port, the paired module, the first conversion module, the transformer and the second conversion module, the second drive battery obtains electrical energy from the first drive battery to charge between two new energy vehicles; and wherein when the DC voltage of the second drive battery passes through the second port, the second conversion module, the transformer, the first conversion module and the third port in sequence, the second drive battery supplies power to the third port, so that the new energy vehicle provides the AC voltage to the outside.

15. The power supply terminal as claimed in claim 14, wherein the first conversion module comprises:

two full bridge MOS transistor groups connected in series with each other, each of the two full bridge MOS transistor groups comprising four MOS transistors, and gates of the four MOS transistors electrically connected to the main control module, the main control module configured to individually control a voltage of the gate of each of the four MOS transistors to obtain different outputs of the first conversion module.

16. The power supply terminal as claimed in claim 15, wherein the four MOS transistors of each full bridge MOS transistor group comprise a first MOS transistor, a second MOS transistor, a third MOS transistor and a fourth MOS transistor;

the drain of the first MOS transistor connected to the source of the second MOS transistor, the drain of the third MOS transistor connected to the source of the fourth MOS transistor, the source of the first MOS transistor connected to the source of the third MOS transistor, and the drain of the third MOS transistor connected to the drain of the fourth MOS transistor;

both the source of the first MOS transistor and the drain of the second MOS transistor formed a first terminal;

both the drain of the first MOS transistor and the drain of the third MOS transistor formed a second terminal; and wherein the first MOS transistor and the third MOS transistor are synchronously turned on under a control of the main control module, and the second MOS transistor and the fourth MOS transistor are synchronously turned on under the control of the main control module, wherein when the first MOS transistor is turned on, the second MOS transistor is in a cutoff and a non-conductive state.

* * * * *